Aug. 22, 1939.   M. B. JACOBS ET AL   2,170,411
SEPARATORY FLASK
Filed June 11, 1937
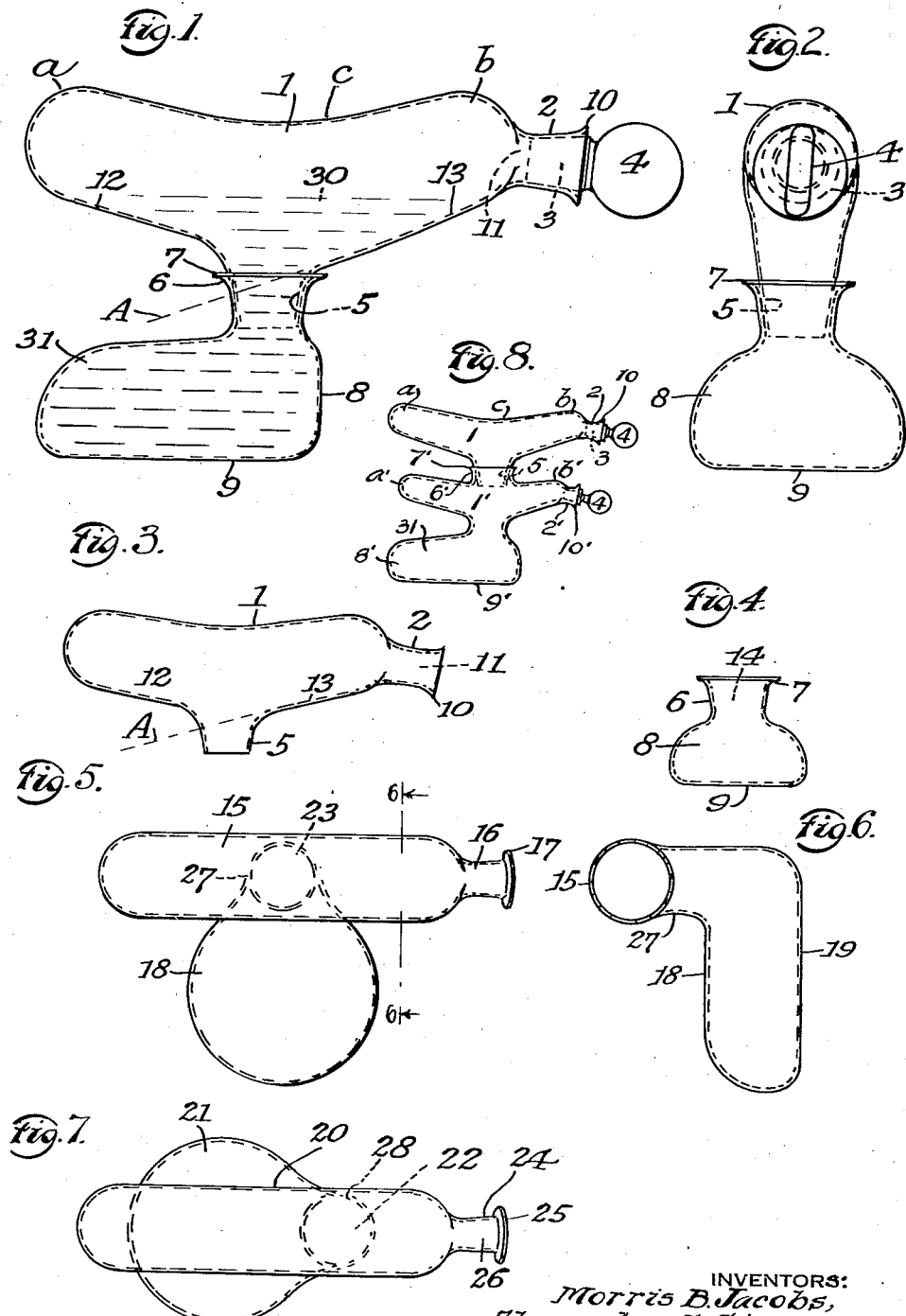
INVENTORS:
Morris B. Jacobs,
Alexander A. Singer.
By Harold D. Penney  ATTORNEY Patented Aug. 22, 1939

2,170,411

UNITED STATES PATENT OFFICE 2,170,411

SEPARATORY FLASK

Morris B. Jacobs, Brooklyn, and Alexander A. Singer, New York, N. Y.

Application June 11, 1937, Serial No. 147,620

15 Claims. (Cl. 23—259)

The present invention relates to an improvement in separatory extraction flasks and is more particularly designed to simplify and improve analytical separatory devices.

These devices are used for the liquid separation and extraction of substances by means of immiscible liquids and for facilitating extractions and decantations of the supernatant liquid layer.

The present invention contemplates, by the use of the present separatory flask, to eliminate the use of plural separatory funnels and like additional devices in the process of extraction, as will be hereinafter explained in detail.

By the use of the present improvement much time, added labor and unnecessary glassware will be eliminated and greater ease will result in performing the various operations needed in the many analytical or manufacturing processes to which this invention may be applied.

The present improved device may be utilized in many manufacturing processes as well as, in its smaller sizes, for analytical work. For instance it may be used for extracting alkaloids, such as for instance, quinine from cinchona bark, by using a volatile extractive, to dissolve out the alkaloid, and then decant and by heat to evaporate the extractive.

In analytical work, there are no limitations to the uses to which the present device may be subjected, such as the gravimetric estimation of vanillin and coumarin by means of extraction with successive portions of ethyl ether or other suitable solvent from an aqueous solution.

The foregoing and other features of advantage will be apprehended as the herein description proceeds and it will be obvious that modifications may be made in the structures herein disclosed without departing from the spirit hereof or the scope of the appended claims.

In the drawing,

Fig. 1 is an assembled view, in side elevation, of a preferred form of the present device;

Fig. 2 is an end view thereof;

Fig. 3 is a side view of the upper separatory flask in reduced scale;

Fig. 4 is an end view of the lower receptacle for the reception of the heavier separative liquid;

Fig. 5 is a plan view of a modified form of separative flask;

Fig. 6 is a sectional view of the flask of Fig. 5 taken on the line 6—6, looking in the direction of the arrows; and Fig. 7 is a plan view of another modified form of flask.

The device of Figs. 1 and 2 is preferably constructed in two separable parts, and while other materials may be used, the complete device, for analytical work, is preferably made of clear glass, so that the reactions and separations may be observed.

The structure of said figures comprises an upper or superposed flask or vessel 1, Fig. 1, the opposite ends a—b of which are higher in plane than the depressed center portion C. The flask 1 may be of substantially cylindrical cross section, indicated in Fig. 2, and is provided at one end with an access aperture 11, which is internally ground to a standard taper, and which receives therein a ground glass stopper 3, the latter being provided with a manipulative wing portion 4, said stopper being a liquid tight fit in the aperture 11. The neck portion 2 forming the aperture 11 may be provided with a flange 10, to facilitate manual handling.

The lower part of the flask 1, as viewed in Figs. 1 and 3, is inclined downwardly, from both ends towards an apertured neck or nipple portion 5, Fig. 3, which neck portion is tapering and is exteriorly ground, and fits into the ground seat of the access aperture 5 of the lower gravity receiving flask 8, Figs. 1 and 2. The neck portion 6 is provided with a handling flange 7. The bottom 9 of the gravity flask 8 is preferably flat so that when the upper flask 1 is operatively assembled to flask 8, the latter will act as a base to support both flasks to permit of the natural gravitational separation of the extraction liquids, during or after extraction occurs.

With the device operatively assembled as disclosed in Figs. 1 and 2, without the stopper 3, the desired quantity of liquid and extraction material is introduced into the assembled flask, and the stopper 3 then tightly introduced into the access aperture 11. In some instances the liquid is permitted to slowly and naturally extract the desired extractive from the material, without agitation, and in other instances the contents of the flask may be manually agitated, to facilitate the extraction process, or the flasks and contents may be centrifuged.

After extraction has occurred, the device is set on its bottom 9, and the solution allowed to settle, the lighter portion of the solution rising into flask 1, and the heavier solution and contents settling into flask 8. After complete settlement of the solution has occurred, the stopper 3 is removed from flask 1, the supernatant lighter extraction 30, Fig. 1, is then decanted therefrom, leaving the heavier solution and contents 31 in flask 8. Due to the low angle A of the forward bottom wall 13 of flask 1, it is obvious that the supernatant liquid 30, Fig. 1, is easily decanted without any tendency of the heavier liquid 31, to be accidentally drawn off through aperture 11.

The foregoing noted structure thus permits of the easy separation of extractions. In many instances there may be plural supernatant extraction layers each of higher or lower specific gravity, and upon settling, either by natural or centrifugal action, each of the layers will arrange itself in precise position due to its specific weight, and each layer may then be decanted successively until the plural solutions are each in separate beakers.

The higher gravity solution remaining in flask 8 may be weighed, analyzed, as may the other separated solutions after separation, as desired.

The use of ground, interchangeably fitted connective terminals between the upper and lower flask permits of the interchange of upper and lower flasks of varying volumetric capacities to suit the work involved.

In Figs. 5, 6 and 7 there is shown an extractor means comprising upper and lower flasks 15 and 18, respectively, similar to the device of Figs. 1 to 4, inclusive with the exception that the flasks are made integral, one with the other, and otherwise the structures are the full equivalent of each other in structure and function.

In Fig. 1 the top, extractive flask 15, is shown superposed upon the lower gravity flask 18, the flask 15 being provided with an open neck 16 having a ground tapered access opening, said neck 16 being provided with an outer rim or flange 17.

The lower or gravity flask 18 is shown as being located offset from the axis of the extraction flask 15 and being integrally connected to the extraction flask 15 by a neck portion 27, Figs. 5 and 6. The gravity flask 18 is provided with a flat bottom 19 so that the complete device may be supported thereon, as described for Figs. 1 and 2.

The purpose of the offset position of the gravity flask 18 is to make it easier under some conditions of use, to decant the extractive and its ingredients.

In Fig. 7, is shown an extraction flask, comprising an upper extractive flask 20 and a lower gravity flask 21 integrally joined by a connecting neck 28, thereby to form an opening 22 between 20 and 21. The extraction flask is provided with a neck portion 24, to form an internally ground and tapered access opening 26, which may be closed by a stopper, as described for Figs. 1 and 2. The neck 24 is provided with a flange or rim 25. As shown in Fig. 7, the gravity flask 21 is not offset as in Fig. 5, but is symmetrically positioned with its vertical axis angularly bisecting the longtudinal axis of the extractive flask 20.

The purpose of the flanges 10, 7, 17 and 25 on the various necks hereinbefore described, is to facilitate the handling of the flasks during use.

The various necks and their appurtenant access openings may be located in other positions than shown, the main purpose of the locations herein being to facilitate the decanting of the contents from the flasks separately for the structure of Figs. 1 to 4, and in the case of decanting from the structure of Figs. 5 and 6, the device is first tilted to decant the supernatant extractive from flask 15 by longitudinal movement, and when flask 15 is emptied, to then roll flask 15 with a combined tilting movement to decant the liquid contents of flask 18.

In decanting the contents of the flask 20, Fig. 7, it is tilted at an angle, longitudinally to decant the supernatant liquid therein, and is then tilted at a still greater angle in the same direction, longitudinally, to decant the contents of the lower flask 21. The flasks 1 and 8, of Figs. 1 and 2 may be rotatably adjusted, relatively, to occupy the same positions of flasks 18 and 21 of Figs. 6 and 7.

As shown in Figs. 1 and 3, the necks 2 of the flask 1 are inclined at a slight angle downwardly, to the longitudinal axis of the flask 1, and in the opposite direction to the normal pouring angle indicated by the dotted lines A, Figs. 1 and 3. This arrangement predisposes the pouring surface of the neck to the decanting angle when the flask 1 is in the normal extracting level, and facilitates decanting of the liquid contents from flask 1.

The pouring necks 6, of the gravity flasks 8 and 18, are offset relative to their flask portions for facilitating the decanting of the contents therefrom with greater ease than would be possible were the neck portions located centrally of the flasks 18.

The device shown in Fig. 8, is so constructed as to provide a gravity flask 31, which rests normally on its bottom 9', and has an offset portion 8'. The extraction flask 1' is integral with the gravity flask 31 at its neck connection.

The extraction flask 1' is longitudinally of circular cross section and is lonigtudinally curved from end $a'$ to its opposite end $b'$, as described for flask 1 in Fig. 1. Flask 1' is provided with an apertured pouring neck 2' which is stoppered with a stopper 4. A pouring lip 10' is provided on the neck end 2'.

Extractor flask 1' is provided at its upper midsection with an apertured, flared neck portion 6, whereby it removably mounts a second, superposed extraction flask 1, which is similar to the extraction flask 1 of Fig. 1, in that it is cylindrical in cross section, is longitudinally curved from its end $a$ to end $b$, being centrally depressed between said ends $a$—$b$ at C. It is provided with an apertured nipple 5 which engages into the apertured neck 6 of flask 1'. Extractor flask 1 is provided with an apertured pouring neck 2, which is closed by a stopper 3 having a manipulable wing 4 thereon.

While the device of Fig. 8 may be used where single or double extractions are desired, it is intended for use where three extractions are indicated wherein the gravity flask 31 will receive the heaviest fluid of a mixture, the extraction flask 1' will receive a supernatant lighter fluid, and the superposed extraction flask 1 will receive a second supernatant and still lighter fluid.

Obviously, when decanting the fluid extracts from the superposed structure of Fig. 8, with flask 1' stoppered, and flask 1 unstoppered, the liquid of flask 1 may then be decanted, without affecting the liquids in the other two flasks. When flask 1 is emptied, it may then be removed, flask 1' then unstoppered and decanted, and finally when the extraction fluid of flask 1' has been removed, the extraction fluid and gravity flask 31 may also be decanted through apertured neck 2'.

What is claimed is:

1. A device of the class described comprising a lower flask having an offset, upstanding neck; and an approximately horizontal elongated upper flask closed at one end and having a stoppered opening at the other, said upper flask having at the midpart of its lower face a downwardly pointed connection joining said neck; the connection being nearer the stoppered end than is said closed end, thereby to facilitate shaking by hand while holding the stopper and flasks together.

2. A device of the class described comprising a lower gravity flask having a flat bottom and an upstanding neck the axis of the neck intersecting and being substantially perpendicular to said bottom; an approximately horizontal elongated upper extraction flask closed at one end and having a stoppered opening at the other, said upper flask having at the mid-part of its lower face a downwardly pointed and tapered apertured nipple rotatably fitting liquid-tight in said upstanding neck; the upper flask being lowest at its mid-part and downwardly inclined from its ends to said nipple; the axis of the nipple being coincident with the axis of the upstanding neck, the major portion of the lower flask being off-set to one side of said axis and adjustable about said axis to lie under either end of, or to either side of, the upper flask; the center of gravity of the upper flask and said device as a whole being over said flat bottom, when horizontal, in any position of relative adjustment of the flasks.

3. A device of the class described comprising a lower gravity flask having a flat base forming bottom, to facilitate heating without glass strains, and an upstanding neck, the axis of the neck intersecting and being substantially perpendicular to said bottom; an approximately horizontal elongated upper extraction flask closed at one end and having an opening at the other end closed with a stopper, said upper flask having at the mid-part of its lower face a downwardly pointed and tapered apertured nipple removably fitting liquid-tight in said upstanding neck; the nipple and neck being near the stoppered end, so that the stopper and neck may be grasped at the same time with one hand during shaking of the flask; the upper flask being lowest at its mid-part and downwardly inclined from its two ends to said nipple; the lower side of the upper flask between the stoppered opening and said nipple being slightly downwardly curved, to facilitate pouring and separation.

4. A device as in claim 3, the axis of the nipple being coincident with the axis of the upstanding neck, the major portion of the lower flask being off-set to one side of said axis and adjustable about said axis to lie under the closed end or under the stoppered end thereof to facilitate separation, or to either side of the upper flask to allow heating of the lower flask without heating the upper flask; the center of gravity of the upper flask and said device as a whole being over said flat bottom when horizontal in any position of relative adjustment of the flasks.

5. A device of the class described comprising a lower flask having an upstanding neck; approximately horizontal elongated intermediate and upper flasks approximately radial to said axis and each being closed at one end and having a stoppered opening at the other; the lower face of the upper flask communicating with the intermediate flask; the lower part of the intermediate flask communicating with said neck.

6. A device of the class described comprising a lower flask having an upstanding neck; approximately horizontal elongated upper and intermediate flasks, each closed at one end and having a stoppered opening at the other, and each being downwardly inclined from its ends to its mid-part; the intermediate flask having an upstanding neck at said mid-part, and at the bottom of its mid-part communicating liquid-tight with the neck of the lower part; the upper flask at the lower face of its mid-part communicating liquid-tight with the upstanding neck of the intermediate flask.

7. A device of the class described comprising a lower flask having an upstanding neck and a body portion substantially laterally offset from the axis of the neck and having a flat base forming bottom; approximately horizontal elongated upper and intermediate flasks, each being closed at one end and having a stoppered opening at the other, and each being downwardly inclined from its ends to its mid-part; the intermediate flask having an upstanding neck at said mid-part, and at the bottom of its mid-part communicating liquid-tight with the neck of the lower flask; the upper flask having, at the lower face of its mid-part, a downwardly pointed apertured nipple fitting liquid-tight in the upstanding neck of the intermediate flask; the axes of the nipple and said necks being coincident and passing through said bottom perpendicularly thereto; said upper flask being adjustable around said axis; the center of gravity of said flasks and the device as a whole being over said flat bottom when horizontal at any position of adjustment of the upper flask.

8. A device of the class described comprising a lower flask; an approximately horizontal elongated upper flask having a stoppered opening at one end, said upper flask having its lower mid-part separably connected to said lower flask.

9. A device of the class described comprising a lower flask having a flat base of sufficient size to support the device, and an upstanding neck whose axis is substantially perpendicular to and passes through said base; a substantially horizontal elongated upper flask having a stoppered opening at one end, said upper flask being substantially at its mid-part mounted on and connected to said upstanding neck, in such position that the principal axis of the upper flask as a whole is substantially parallel with said base.

10. A device of the class described comprising a lower gravity flask having a flat base of sufficient size to support the device, and an upstanding off-set neck whose axis is substantially perpendicular to and passes through said base; an approximately horizontal elongated upper extraction flask closed at one end and having a stoppered opening at the other, said upper flask being at its mid-part rotatably and separably mounted on and connected to said upstanding neck, in such position that the principal axis of the upper flask as a whole will remain in a plane substantially parallel with said base.

11. A device of the class described comprising a lower flask; a substantially horizontal elongated upper flask closed at one end and having a stoppered opening at the other, said upper flask being substantially at its lower mid-part mounted on and connected to said lower flask; the bottom of the upper flask being downwardly sloping from its two ends to the connection at said mid-part.

12. A device of the class described comprising a lower flask; the device, and an upstanding off-set neck whose axis is substantially perpendicular to and passes through said base; a substantially horizontal elongated upper flask being substantially at its mid-part mounted on and connected to said lower flask; the bottom of the upper flask being sloping from its two ends downwardly to the connection at said mid-part.

13. A device of the class described comprising a lower flask having a flat base of sufficient size to support the device, and an upstanding neck whose axis is substantially perpendicular to and passes through said base; a substantially horizontal elongated upper extraction flask closed at one end and having a stoppered opening at the other, said upper flask being substantially at its mid-part mounted on and connected to said upstanding neck, in such position that the principal axis of the upper flask as a whole is substantially parallel with said base; the bottom of the upper flask being sloping from its two ends to the connection at said mid-point.

14. A device of the class described comprising an upper flask; a lower gravity flask supporting the upper flask and having a flat base of sufficient size to support the device, and an upstanding neck whose axis is substantially perpendicular to and passes through said base; said upper flask being elongated and approximately horizontal and having a stoppered opening at one end, said upper flask being at its lower part mounted on and connected to said upstanding neck, in such position that the principal axis of the upper flask as a whole is parallel with said base.

15. A device of the class described comprising a lower gravity flask having a flat base and an upstanding off-set neck whose axis is substantially perpendicular to and passes through said base; an approximately horizontal elongated upper extraction flask closed at one end and having a stoppered opening at the other, said upper flask being at its lower part rotatably and separably mounted on and connected to said upstanding neck, in such position that the principal axis of the upper flask as a whole will remain in a plane substantially parallel with said base; said base being of sufficient size to support the device.

MORRIS B. JACOBS.
ALEXANDER A. SINGER.